United States Patent
Ding et al.

(10) Patent No.: US 12,049,407 B2
(45) Date of Patent: Jul. 30, 2024

(54) MATERIALS, METHODS AND TECHNIQUES FOR GENERATING DOPED CERIUM OXIDE

(71) Applicant: Lynas Rare Earths Limited, East Perth WA (AU)

(72) Inventors: Jiawen Ding, Pahang Darul Makmur (MY); Pol Le-Roux, Pahang Darul Makmur (MY); Norazihan Zulkifli, Pahang Darul Makmur (MY); Chelto Smith, Pahang Darul Makmur (MY)

(73) Assignee: Lynas Rare Earths Limited, Perth WA (AU)

( * ) Notice: Subject to any disclaimer, the term of this patent is extended or adjusted under 35 U.S.C. 154(b) by 0 days.

(21) Appl. No.: 18/054,825

(22) Filed: Nov. 11, 2022

(65) Prior Publication Data
US 2023/0081994 A1    Mar. 16, 2023

Related U.S. Application Data

(62) Division of application No. 17/534,050, filed on Nov. 23, 2021.

(60) Provisional application No. 63/117,558, filed on Nov. 24, 2020.

(51) Int. Cl.
*C01F 17/30* (2020.01)

(52) U.S. Cl.
CPC .......... *C01F 17/30* (2020.01); *C01P 2004/64* (2013.01); *C01P 2006/12* (2013.01); *C01P 2006/14* (2013.01)

(58) Field of Classification Search
CPC .. C01F 17/30; C01P 2004/64; C01P 2006/12; C01P 2006/14
See application file for complete search history.

(56) References Cited

U.S. PATENT DOCUMENTS

| | | | |
|---|---|---|---|
| 4,663,137 A | 5/1987 | Chane-Ching et al. | |
| 5,529,969 A | 6/1996 | Bonneau et al. | |
| 6,350,421 B1 | 2/2002 | Strehlau et al. | |
| 7,182,929 B1 | 2/2007 | Singhal et al. | |
| 7,361,322 B2 | 4/2008 | Aozasa et al. | |
| 7,468,218 B2 | 12/2008 | Marina et al. | |
| 7,871,459 B2 | 1/2011 | Stephanopoulos et al. | |
| 8,377,841 B2 | 2/2013 | Flytzani-Stephanopoulos et al. | |
| 2003/0215378 A1 | 11/2003 | Zhou et al. | |
| 2004/0186016 A1* | 9/2004 | Bog | C01F 17/30 502/304 |
| 2010/0329954 A1 | 12/2010 | Yokota et al. | |
| 2012/0122671 A1 | 5/2012 | Polli et al. | |
| 2012/0129690 A1 | 5/2012 | Larcher et al. | |
| 2014/0179515 A1 | 6/2014 | Ohtake et al. | |
| 2016/0263564 A1 | 9/2016 | Morohoshi et al. | |
| 2016/0318804 A1 | 11/2016 | Cho et al. | |
| 2017/0152421 A1 | 6/2017 | Ohtake et al. | |
| 2017/0313594 A1 | 11/2017 | Ohtake et al. | |
| 2017/0320042 A1 | 11/2017 | Suib et al. | |
| 2018/0345217 A1 | 12/2018 | Goffe | |
| 2018/0345218 A1 | 12/2018 | Goffe | |
| 2019/0330073 A1 | 10/2019 | Ohtake et al. | |

FOREIGN PATENT DOCUMENTS

| | | |
|---|---|---|
| CN | 102557105 A | 7/2012 |
| CN | 106268806 B | 12/2018 |
| CN | 111434379 A | 7/2020 |
| EP | 1435338 A1 | 7/2004 |
| JP | 2012200719 A | 10/2012 |
| WO | 2011065416 A1 | 6/2011 |
| WO | 2011065417 A1 | 6/2011 |
| WO | 2017198738 A1 | 11/2017 |

OTHER PUBLICATIONS

Katta et al., "Doped nanosized ceria solid solutions for low temperature soot oxidation: Zirconium versus lanthanum promoters", Applied Catalysis B: Environmental, 2010, vol. 101, pp. 101-108.
Palard et al., "Effect of hydrothermal ripening on the photoluminescence properties of pure and doped cerium oxide nanoparticles", Materials Chemistry and Physics, 2010, vol. 120, pp. 79-88.
International Search Report and Written Opinion for Application No. PCT/IB2021/060893 dated Mar. 2, 2022 (10 pages).
Kundakovic et al., "Cu- and Ag-modified cerium oxide catalysts for methane oxidation," Journal of Catalysis, 1998, 179: 203-221.
Rosid et al., "Characterization and modelling optimization on methanation activity using Box-Behnken design through cerium doped catalysts," Journal of Cleaner Production, 2018, 170: 278-287.
Japanese Patent Office Action for Application No. 2023-530943 dated Nov. 28, 2023 (6 pages with translation).

* cited by examiner

*Primary Examiner* — James A Fiorito
(74) *Attorney, Agent, or Firm* — Michael Best & Friedrich LLP

(57) ABSTRACT

Doped cerium oxide particles may comprise about 90 weight percent (wt. %) to about 99.9 wt. % cerium oxide ($CeO_2$) and up to about 10 wt. % dopant. Exemplary doped cerium oxide particles may have a BET specific surface area of more than 150 m$^2$/g after calcination at 500° C. for 8 hours. Exemplary doped cerium oxide particles may have an oxygen storage capacity (OSC) of more than 900 μmol·$O_2$/g after calcination at 500° C. for 8 hours.

10 Claims, No Drawings

MATERIALS, METHODS AND TECHNIQUES FOR GENERATING DOPED CERIUM OXIDE

CROSS-REFERENCE TO RELATED APPLICATIONS

This application is a divisional of U.S. patent application Ser. No. 17/534,050, filed Nov. 23, 2021, which claims priority to U.S. Provisional Application No. 63/117,558, filed Nov. 24, 2020, the entire contents of each of which are hereby incorporated by reference.

FIELD

Materials, methods, and techniques disclosed herein relate to doped cerium oxide. More specifically, the instant disclosure relates to generation and properties of doped cerium oxide particles.

INTRODUCTION

Cerium (Ce) is a rare earth element that can exist in either a trivalent (cerous) or tetravalent (ceric) state, also known as ceria or cerium. Cerium oxide containing materials have been used in various applications involving catalysis, such as for purifying vehicle exhaust gas. Cerium oxide materials typically have the property of absorbing oxygen under an oxidizing atmosphere and desorbing oxygen under a reducing atmosphere. This oxygen absorbing/desorbing capability enables cerium oxide materials to be used in a variety of applications, such as purifying noxious components in process gases.

SUMMARY

In one aspect, doped cerium oxide particles are disclosed. Exemplary doped cerium oxide particles may comprise about 90 weight percent (wt. %) to about 99.9 wt. % cerium oxide ($CeO_2$) and up to about 10 wt. % dopant. Exemplary doped cerium oxide particles may have a BET specific surface area of more than 150 $m^2/g$ after calcination at 500° C. for 8 hours. Exemplary doped cerium oxide particles may have an oxygen storage capacity (OSC) of more than 900 $\mu mol \cdot O_2/g$ after calcination at 500° C. for 8 hours.

In another aspect, a method for generating a doped cerium oxide particle is disclosed. An exemplary method may comprise adding at least one dopant to a $Ce(NO_3)_4$ solution, the $Ce(NO_3)_4$ solution having a rare earth oxide concentration of between 10 grams and 50 grams $CeO_2$ per liter solvent; after adding the at least one dopant, heating the $Ce(NO_3)_4$ solution with dopant to cause hydrolysis; cooling a resulting mixture; neutralizing the resulting mixture to a pH between 8 and 9; filtrating the neutralized mixture to generate a filtrate and a permeate; calcinating the filtrate; and drying.

There is no specific requirement that a material, technique or method relating to doped cerium oxide include all of the details characterized herein, in order to obtain some benefit according to the present disclosure. Thus, the specific examples characterized herein are meant to be exemplary applications of the techniques described, and alternatives are possible.

DETAILED DESCRIPTION

Materials, methods and techniques disclosed and contemplated herein relate to generating doped cerium oxide. Exemplary doped cerium oxide can be used in a variety of applications and may show improved properties in oxygen mobility, particularly as compared to ceria. For instance, doped cerium oxide disclosed herein may be used as catalysts, such as during hydrogen gas ($H_2$) generation processes, converting carbon dioxide ($CO_2$) to methane ($CH_4$) processes, and removing nitrous oxide ($N_2O_2$) from nitric acid ($HNO_3$) and/or adipic acid ($CH_2)_4(COOH)_2$ processes, to name a few. Certain exemplary doped cerium oxide particles disclosed herein may be particularly suited for high performance in the temperature range from about 300° C. to about 800° C. Other applications for exemplary doped cerium oxide are contemplated.

Definitions

Unless otherwise defined, all technical and scientific terms used herein have the same meaning as commonly understood by one of ordinary skill in the art. In case of conflict, the present document, including definitions, will control. Example methods and materials are described below, although methods and materials similar or equivalent to those described herein can be used in practice or testing of the present disclosure. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

Definitions of specific functional groups and chemical terms are described in more detail below. For purposes of this disclosure, the chemical elements are identified in accordance with the Periodic Table of the Elements, CAS version, Handbook of Chemistry and Physics, $75^{th}$ Ed., inside cover, and specific functional groups are generally defined as described therein.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

I. Exemplary Doped Cerium Oxide Particles

Exemplary doped cerium oxide particles may have various chemical constituents and physical properties. Various aspects are discussed below.

Exemplary doped cerium oxide particles have a majority cerium oxide ($CeO_2$).

Typically, exemplary doped cerium oxide particles may comprise about 90.0 weight percent (wt %) to about 99.9 wt % cerium oxide ($CeO_2$). In various implementations, exemplary doped cerium oxide particles may comprise about 90.0 wt % to about 99.9 wt % cerium oxide ($CeO_2$); about 90 wt % to about 95 wt % cerium oxide ($CeO_2$); about 95 wt % to about 99.9 wt % cerium oxide ($CeO_2$); about 90 wt % to about 92 wt % cerium oxide ($CeO_2$); between 92 wt % and 94 wt % cerium oxide ($CeO_2$); between 94 wt % and 96 wt % cerium oxide ($CeO_2$); between 96 wt % and 98 wt % cerium oxide ($CeO_2$); between 97 wt % and 99 wt %; between 95 wt % and 96 wt %; between 96 wt % and 97 wt % cerium oxide ($CeO_2$); between 97 wt % and 98 wt % cerium oxide ($CeO_2$); or between 98 and 99.9 wt % cerium oxide ($CeO_2$). In various implementations, exemplary doped cerium oxide particles may comprise no less than 90 wt % cerium oxide ($CeO_2$); no less than 91 wt % cerium oxide ($CeO_2$); no less than 92 wt % cerium oxide ($CeO_2$); no less than 93 wt % cerium oxide ($CeO_2$); no less than 94 wt % cerium oxide ($CeO_2$); no less than 95 wt % cerium oxide ($CeO_2$); no less than 96 wt % cerium oxide ($CeO_2$); no less than 97 wt % cerium oxide ($CeO_2$); no less than 98 wt % cerium oxide ($CeO_2$); or no less than 99 wt % cerium oxide ($CeO_2$). In various implementations, exemplary doped cerium oxide particles may comprise less than 99.9 wt % cerium oxide ($CeO_2$); less than 98 wt % cerium oxide ($CeO_2$); less than 97 wt % cerium oxide ($CeO_2$); less than 96 wt % cerium oxide ($CeO_2$); less than 95 wt % cerium oxide ($CeO_2$); less than 94 wt % cerium oxide ($CeO_2$); less than 93 wt % cerium oxide ($CeO_2$); less than 92 wt % cerium oxide ($CeO_2$); or less than 91 wt % cerium oxide ($CeO_2$).

Exemplary doped cerium oxide particles may have about 0.1 wt % to about 10 wt % dopant. In various implementations, doped cerium oxide particles may have between 0.1 wt % and 10.0 wt % dopant; between 0 wt % and 5 wt % dopant; between 0.1 wt % and 5 wt % dopant; between 5 wt % and 10 wt % dopant; between 0.1 wt % and 3.0 wt % dopant; between 3.0 wt % and 6.0 wt % dopant; between 6.0 wt % and 9.0 wt % dopant; between 7.0 wt % and 10.0 wt % dopant; between 0.1 wt % and 1 wt % dopant; between 1 wt % and 2 wt % dopant; between 2 wt % and 3 wt % dopant; between 3 wt % and 4 wt % dopant; between 4 wt % and 5 wt % dopant; between 5 wt % and 6 wt % dopant; between 6 wt % and 7 wt % dopant; between 7 wt % and 8 wt % dopant; between 8 wt % and 9 wt % dopant; or between 9 wt % and 10 wt % dopant. In various implementations, exemplary doped cerium oxide particles have no more than 10 wt % dopant; no more than 9 wt % dopant; no more than 8 wt % dopant; no more than 7 wt % dopant; no more than 6 wt % dopant; no more than 5 wt % dopant; no more than 4 wt % dopant; no more than 3 wt % dopant; no more than 2 wt % dopant; no more than 1 wt % dopant; no more than 0.5 wt % dopant; or no more than 0.1 wt % dopant. In various implementations, exemplary doped cerium oxide particles have more than 0.1 wt % dopant; more than 0.5 wt % dopant; more than 1 wt % dopant; more than 2 wt % dopant; more than 3 wt % dopant; more than 4 wt % dopant; more than 5 wt % dopant; more than 6 wt % dopant; more than 7 wt % dopant; more than 8 wt % dopant; or more than 9 wt % dopant.

Exemplary doped cerium oxide particles may include one or more dopants. Dopants may be selected based on considerations for one or more end uses of the doped cerium oxide particles. Exemplary constituents that may be doped into exemplary cerium oxide particles include silicon dioxide ($SiO_2$) powder, silicon dioxide ($SiO_2$) gel, tetraethyl orthosilicate (TEOS), white carbon black (precipitated silica), aluminum oxide ($Al_2O_3$) powder, rare earth oxides such as lanthanum oxide ($La_2O_3$) and neodymium(III) oxide ($Nd_2O_3$), a zeolite, or combinations thereof. Example zeolites may include Zeolite Socony Mobil-5 (H-ZSM-5), H-Y zeolite, and H-β zeolite.

Exemplary doped cerium oxide particles can be described in terms of physical properties, such as BET specific surface area, oxygen storage capacity, total pore volume, crystal size, and TPR profile. BET specific surface area determinations may be conducted using $N_2$ physical adsorption-desorption measurements carried out on the ASAP2020 automatic physical adsorption apparatus manufactured by Micromeritics Company. The specific surface area of a sample may be calculated according to the BET (Brunauer-Emmett-Teller) multi-point method at P/P0=0.05-0.35; total pore volume may be calculated by using single point adsorption at P/P0=0.99, and pore volume distribution may be calculated using the BJH method of desorption isotherm.

X-ray diffraction (XRD) may be carried out on a D/max 2550VB/PC X-ray diffractometer manufactured by RIGAKU Company, with Cu Kα radiation source (40 kV, 40 mA), scanning range 2θ=10~80°, scanning rate of 6°/min. The crystal size (nm) can be calculated according to Scherrer formula $d=k\lambda/\beta \cos\theta$, where, d is the crystal size (nm), λ, is the X-ray wavelength (0.15418 nm), β is width of half height of diffraction peak (degree), θ is diffraction angle (degree), and K is Scherrer constant (0.89).

Hydrogen temperature-programmed reduction ($H_2$-TPR) measurement may be carried out on AUTOChem II 2920 type of chemical adsorption instrument manufactured by Micromeritics Company, with a carrier gas containing 90% argon and 10% hydrogen, at a gas flow rate of 50 ml/min, at a heating rate of 10° C./min from 100 to 800° C., and using 0.1 g of a sample.

The oxygen storage capacity (OSC) of the sample may be determined by a thermal conductivity detector (TCD), and the hydrogen consumption of the sample may be converted by the reduction peak area of a certain amount of copper oxide powder. In the $H_2$-TPR curve, a ratio of the S1/S2 was defined as the ratio of area (S1) between the baseline and the TPR curve in the temperature range of 200 to 600° C., to the area (S2) between the baseline and the TPR curve in the temperature range of 600 to 800° C.

Doped cerium oxide particles may be characterized in terms of BET specific surface area. In some instances, exemplary doped cerium oxide particles may have a BET specific surface area, after calcination at 300° C. for 10 hours, of more than 200 $m^2/g$, more than 210 $m^2/g$, more than 220 $m^2/g$; more than 230 $m^2/g$; or more than 240 $m^2/g$. In some instances, exemplary doped cerium oxide particles may have a BET specific surface area, after calcination at 300° C. for 10 hours, of no more than 250 $m^2/g$; no more than 240 $m^2/g$; no more than 230 $m^2/g$; no more than 220 $m^2/g$; or no more than 210 $m^2/g$. In various implementations, exemplary doped cerium oxide particles may have a BET specific surface area, after calcination at 300° C. for 10 hours, of about 200 $m^2/g$ to about 250 $m^2/g$; between 200 $m^2/g$ and 225 $m^2/g$; between 225 $m^2/g$ and 250 $m^2/g$; between 200 $m^2/g$ and 210 $m^2/g$; between 210 $m^2/g$ and 220 $m^2/g$; between 220 $m^2/g$ and 230 $m^2/g$; between 230 $m^2/g$ and 240 $m^2/g$; or between 240 $m^2/g$ and 250 $m^2/g$.

In some instances, exemplary doped cerium oxide particles may have a BET specific surface area, after calcination at 500° C. for 8 hours, of more than 150 $m^2/g$; more than 160 $m^2/g$; more than 170 $m^2/g$; more than 180 $m^2/g$; or more than 190 m²/g. In some instances, exemplary doped cerium oxide particles may have a BET specific surface area, after calcination at 500° C. for 8 hours, of no more than 200 m²/g; no more than 190 m²/g; no more than 180 m²/g; no more than 170 m²/g; or no more than 160 m²/g. In various implementations, exemplary doped cerium oxide particles may have a BET specific surface area, after calcination at 500° C. for 8 hours, of about 150 m²/g to about 200 m²/g; between 150 m²/g and 175 m²/g; between 175 m²/g and 200 m²/g; between 150 m²/g and 160 m²/g; between 160 m²/g and 170 m²/g; between 170 m²/g and 180 m²/g; between 180 m²/g and 190 m²/g; or between 190 m²/g and 200 m²/g.

In some instances, exemplary doped cerium oxide particles may have a BET specific surface area, after calcination at 700° C. for 5 hours, of more than 100 m²/g; more than 110 m²/g; more than 120 m²/g; more than 130 m²/g; or more than 140 m²/g. In some instances, exemplary doped cerium oxide particles may have a BET specific surface area, after calcination at 700° C. for 5 hours, of no more than 150 m²/g; no more than 140 m²/g; no more than 130 m²/g; no more than 120 m²/g; or no more than 110 m²/g. In various implementations, exemplary doped cerium oxide particles may have a BET specific surface area, after calcination at 700° C. for 5 hours, of about 100 m²/g to about 150 m²/g; between 100 m²/g and 125 m²/g; between 125 m²/g and 150 m²/g; between 100 m²/g and 110 m²/g; between 110 m²/g and 120 m²/g; between 120 m²/g and 130 m²/g; between 130 m²/g and 140 m²/g; or between 140 m²/g and 150 m²/g.

In some instances, exemplary doped cerium oxide particles may have a BET specific surface area, after calcination at 900° C. for 5 hours, of more than 55 m²/g; more than 65 m²/g; more than 75 m²/g; more than 85 m²/g; or more than 90 m²/g. In some instances, exemplary doped cerium oxide particles may have a BET specific surface area, after calcination at 900° C. for 5 hours, of no more than 100 m²/g; no more than 90 m²/g; no more than 80 m²/g; no more than 70 m²/g; or no more than 60 m²/g. In various implementations, exemplary doped cerium oxide particles may have a BET specific surface area, after calcination at 900° C. for 5 hours, of about 55 m²/g to about 100 m²/g; 55 m²/g and 80 m²/g; between 75 m²/g and 100 m²/g; between 55 m²/g and 65 m²/g; between 65 m²/g and 75 m²/g; between 75 m²/g and 85 m²/g; between 85 m²/g and 95 m²/g; or between 90 m²/g and 100 m²/g.

Doped cerium oxide particles may be characterized in terms of oxygen storage capacity (OSC). Exemplary doped cerium oxide particles may have an OSC, after calcination at 500° C. for 8 hours, of more than 900 µmol·O₂/g; more than 1000 µmol·O₂/g; or more than more than 1100 µmol·O₂/g. Exemplary doped cerium oxide particles may have an OSC, after calcination at 500° C. for 8 hours, of no more than 1200 µmol·O₂/g; no more than 1100 µmol·O₂/g; or no more than more than 1000 µmol·O₂/g. In various implementations, exemplary doped cerium oxide particles may have an OSC, after calcination at 500° C. for 8 hours, of between 900 µmol·O₂/g and 1200 µmol·O₂/g; between 900 µmol·O₂/g and 1050 µmol·O₂/g; between 1050 µmol·O₂/g and 1200 µmol·O₂/g; between 900 µmol·O₂/g and 1000 µmol·O₂/g; between 1000 µmol·O₂/g and 1100 µmol·O₂/g; or between 1100 µmol·O₂/g and 1200 µmol·O₂/g.

Exemplary doped cerium oxide particles may have an OSC, after calcination at 700° C. for 5 hours, of more than 800 µmol·O₂/g; more than 900 µmol·O₂/g; or more than more than 1000 µmol·O₂/g. Exemplary doped cerium oxide particles may have an OSC, after calcination at 700° C. for 5 hours, of no more than 1100 µmol·O₂/g; no more than 1000 µmol·O₂/g; or no more than more than 900 µmol·O₂/g. In various implementations, exemplary doped cerium oxide particles may have an OSC, after calcination at 700° C. for 5 hours, of 800 µmol·O₂/g to 1100 µmol·O₂/g; 800 µmol·O₂/g to 950 µmol·O₂/g; between 950 µmol·O₂/g and 1100 µmol·O₂/g; between 800 µmol·O₂/g and 900 µmol·O₂/g; between 900 µmol·O₂/g and 1000 µmol·O₂/g; or between 1000 µmol·O₂/g and 1100 µmol·O₂/g.

Exemplary doped cerium oxide particles may have an OSC, after calcination at 900° C. for 5 hours, of more than 700 µmol·O₂/g; more than 800 µmol·O₂/g; or more than 900 µmol·O₂/g. Exemplary doped cerium oxide particles may have an OSC, after calcination at 900° C. for 5 hours, of no more than 1000 µmol·O₂/g; no more than 900 µmol·O₂/g; or no more than 800 µmol·O₂/g. In various implementations, exemplary doped cerium oxide particles may have an OSC, after calcination at 900° C. for 5 hours, of between 700 µmol·O₂/g and 1000 µmol·O₂/g; between 700 µmol·O₂/g and 850 µmol·O₂/g; between 850 µmol·O₂/g and 1000 µmol·O₂/g; between 700 µmol·O₂/g and 800 µmol·O₂/g; between 800 µmol·O₂/g and 900 µmol·O₂/g; or between 900 µmol·O₂/g and 1000 µmol·O₂/g.

Doped cerium oxide particles may be characterized in terms of total pore volume. Exemplary doped cerium oxide particles may have a total pore volume, after calcination at 300° C. for 10 hours, of greater than 0.40 mL/g; greater than 0.50 mL/g; greater than 0.60 mL/g; or greater than 0.70 mL/g. Exemplary doped cerium oxide particles may have a total pore volume, after calcination at 300° C. for 10 hours, of no greater than 0.80 mL/g; no greater than 0.70 mL/g; greater than 0.60 mL/g; or greater than 0.70 mL/g. In various implementations, exemplary doped cerium oxide particles may have a total pore volume, after calcination at 300° C. for 10 hours, of between 0.4 mL/g and 0.8 mL/g; between 0.4 mL/g and 0.6 mL/g; between 0.6 mL/g and 0.8 mL/g; between 0.4 mL/g and 0.5 mL/g; between 0.5 mL/g and 0.6 mL/g; between 0.6 mL/g and 0.7 mL/g; or between 0.7 mL/g and 0.8 mL/g.

Doped cerium oxide particles may be characterized in terms of total pore volume. Exemplary doped cerium oxide particles may have a total pore volume, after calcination at 500° C. for 8 hours, of greater than 0.40 mL/g; greater than 0.50 mL/g; greater than 0.60 mL/g; or greater than 0.70 mL/g. Exemplary doped cerium oxide particles may have a total pore volume, after calcination at 500° C. for 8 hours, of no greater than 0.80 mL/g; no greater than 0.70 mL/g; greater than 0.60 mL/g; or greater than 0.70 mL/g. In various implementations, exemplary doped cerium oxide particles may have a total pore volume, after calcination at 500° C. for 8 hours, of between 0.4 mL/g and 0.8 mL/g; between 0.4 mL/g and 0.6 mL/g; between 0.6 mL/g and 0.8 mL/g; between 0.4 mL/g and 0.5 mL/g; between 0.5 mL/g and 0.6 mL/g; between 0.6 mL/g and 0.7 mL/g; or between 0.7 mL/g and 0.8 mL/g.

Doped cerium oxide particles may be characterized in terms of total pore volume. Exemplary doped cerium oxide particles may have a total pore volume, after calcination at 700° C. for 5 hours, of greater than 0.35 mL/g; greater than 0.45 mL/g; greater than 0.55 mL/g; or greater than 0.65 mL/g. Exemplary doped cerium oxide particles may have a total pore volume, after calcination at 700° C. for 5 hours, of no greater than 0.70 mL/g; no greater than 0.60 mL/g; greater than 0.50 mL/g; or greater than 0.40 mL/g. In various implementations, exemplary doped cerium oxide particles may have a total pore volume, after calcination at 700° C. for 5 hours, of between 0.35 mL/g and 0.7 mL/g; between 0.35 mL/g and 0.53 mL/g; between 0.52 mL/g and 0.7 mL/g;

between 0.35 mL/g and 0.45 mL/g; between 0.45 mL/g and 0.55 mL/g; between 0.55 mL/g and 0.65 mL/g; or between 0.6 mL/g and 0.7 mL/g.

Doped cerium oxide particles may be characterized in terms of total pore volume. Exemplary doped cerium oxide particles may have a total pore volume, after calcination at 900° C. for 5 hours, of greater than 0.35 mL/g; greater than 0.45 mL/g; greater than 0.55 mL/g; or greater than 0.65 mL/g. Exemplary doped cerium oxide particles may have a total pore volume, after calcination at 900° C. for 5 hours, of no greater than 0.70 mL/g; no greater than 0.60 mL/g; greater than 0.50 mL/g; or greater than 0.40 mL/g. In various implementations, exemplary doped cerium oxide particles may have a total pore volume, after calcination at 900° C. for 5 hours, of between 0.35 mL/g and 0.7 mL/g; between 0.35 mL/g and 0.53 mL/g; between 0.52 mL/g and 0.7 mL/g; between 0.35 mL/g and 0.45 mL/g; between 0.45 mL/g and 0.55 mL/g; between 0.55 mL/g and 0.65 mL/g; or between 0.6 mL/g and 0.7 mL/g.

Doped cerium oxide particles may be characterized in terms of pore volume (d>3 nm) divided by total pore volume. Exemplary doped cerium oxide particles may have a pore volume (d>3 nm)/total pore volume of at least 98% after calcination 300° C. for 10 hours. Exemplary doped cerium oxide particles may have a pore volume (d>3 nm)/total pore volume of at least 98% after calcination 500° C. for 8 hours. Exemplary doped cerium oxide particles may have a pore volume (d>3 nm)/total pore volume of at least 98% after calcination 700° C. for 5 hours. Exemplary doped cerium oxide particles may have a pore volume (d>3 nm)/total pore volume of at least 98% after calcination 900° C. for 8 hours.

Doped cerium oxide particles may be characterized in terms of crystal size. Exemplary doped cerium oxide particles may have a crystal size of less than about 10 nm after calcination at 500° C. for 8 hours. In various implementations, exemplary doped cerium oxide particles may have a crystal size, after calcination at 500° C. for 8 hours, of 6 nm to 10 nm; 6 nm to 8 nm; 8 nm to 10 nm; 6 nm to 7 nm; 7 nm to 8 nm; 8 nm to 9 nm; or 9 nm to 10 nm. In various implementations, exemplary doped cerium oxide particles may have a crystal size, after calcination at 500° C. for 8 hours, of no less than 6 nm; no less than 7 nm; no less than 8 nm; or no less than 9 nm. In various implementations, exemplary doped cerium oxide particles may have a crystal size, after calcination at 500° C. for 8 hours, of no more than 10 nm; no more than 9 nm; no more than 8 nm; or no more than 7 nm.

Doped cerium oxide particles may be characterized in terms of hydrogen ($H_2$)-temperature programmed reduction (TPR) profile. In one aspect, the graphs generated by $H_2$-TPR profiles may be defined in terms of a ratio, A1/A2 of (A1) the area defined by the $H_2$-TPR curve in the temperature range of 200° C. to 600° C. and the baseline, to (A2) the area defined by the H2-TPR curve in the temperature range of 600° C. to 800° C. and the baseline. Exemplary doped cerium oxide particles may have a ratio of A1/A2, after calcination at 500° C. for 8 hours, of between 1.0 and 1.5. Exemplary doped cerium oxide particles may have a ratio of A1/A2, after calcination at 700° C. for 5 hours, of between 0.7 and 1.0. Exemplary doped cerium oxide particles may have a ratio of A1/A2, after calcination at 900° C. for 5 hours, of between 0.35 and 0.7. The doped cerium oxide particles may have a ratio of A1/A2, after calcination at 500° C. for 8 hours, of no more than 1.5, no more than 1.25, or no more than 1.0. The doped cerium oxide particles may have a ratio of A1/A2, after calcination at 500° C. for 8 hours, of more than 0.7, more than 1.0, or more than 1.3.

II. Exemplary Methods for Generating Cerium (IV) Hydroxide

Exemplary methods can be used to generate cerium (IV) hydroxide ($Ce(OH)_4$) precipitate and cerium (IV) nitrate solution. In turn, generated cerium (IV) hydroxide precipitate and cerium (IV) nitrate solutions may be used during doped cerium oxide synthesis. Other embodiments than those discussed below may include more or fewer operations.

An example method may begin with a basic solution. Example basic solutions may be prepared to have a base concentration of between 1.0 mol/L and 4.0 mol/L and may be at a temperature of no greater than 30° C., such as between 20° C. and 30° C. An example basic solution is NaOH. Agitation may be performed at about 800 rpm to about 1200 rpm while preparing the basic solution.

Next, raw material is added to the basic solution. In some instances, raw material may be added as a batch operation. Typically, the temperature of the basic solution is 20-30° C. Example raw material may be cerium chloride ($CeCl_3$). In some instances, raw material added to the basic solution includes 50-200 g of $CeO_2$/L, with a free [H+] of between 0.05-0.5 mol/L. In some instances, example raw material may be diluted prior to being added to the NaOH solution. As an example, the 50-200 g of $CeO_2$/L $CeCl_3$ solution may be prepared by dilution of a 300-500 g of $CeO_2$/L initial solution. Deionized water may be used for dilution.

A resulting mixture of raw material and basic solution may be subjected to air bubbling and/or agitation. In some instances, the basic solution may be subjected to air bubbling before adding raw material. As an example, air bubbling may be provided at a rate of 150-300 L-air/hour or more. Air bubbling and/or agitation may be performed for a predetermined amount of time, such as between 1 hour and 5 hours. During that time, reverse precipitation may occur.

After reverse precipitation, the resulting mixture may be aged for a period of time, such as 2 hours to 6 hours, and typically at a temperature between 20° C. and 30° C. Usually, a resulting mixture has a pH of at least 12, such as a pH between 12.0 and 13.5. During aging, a resulting mixture may change color from a purple hue to a yellow hue.

Filtration may be performed to remove various ions. For instance, when NaOH is used as the basic solution, $Na^+$ and $Cl^-$ ions may be removed during filtration. Various filtration methods known in the art may be selected to achieve filtration of target ions. One or more washing operations may be performed to further effectuate removal of target ions.

After removal of target ions, the precipitate may be re-pulped into a basic solution having a concentration of 0.01-0.1 mol base per liter. In some instances, NaOH may be used for the basic solution. Re-pulping may be accompanied by agitation at, for example, 800 rpm to 1200 rpm, and may be performed at room temperature, such as between 20° C. and 30° C.

Aging of the solution may be accompanied by air bubbling through a porous air distributor. Air bubbling may be provided at a flow rate of 150-300 L air per hour. Aging may be performed for a predetermined period of time, such as at least 30 minutes or between 1 hour to 6 hours, and at a temperature between 20° C. and 30° C. Resulting mixtures are then subjected to a second filtration process.

After filtration, the mixture may be washed. A first wash may be performed using hot de-ionized water (which may be between 40° C. and 80° C. or between 50° C. and 65° C.). The first wash may be performed multiple times, such as two times, three times, four times, five times, or up to ten times.

A second wash may be performed with a mixture of hot deionized water (which may be between 40° C. and 80° C. or between 50° C. and 65° C.) and a strong acid, such as nitric acid ($HNO_3$). Mixtures used for the second wash may have a pH between about 4 and about 5. Resulting filtrates may have a pH between 8 and 10. Resulting filtrates may have an electrical conductivity (EC) of less than 20 µS/cm. The second wash may be performed multiple times, such as two times, three times, four times, five times, or up to ten times.

After washing, a cerium (IV) hydroxide wet cake remains. In some instances, the cerium (IV) hydroxide wet cake may have a loss of ignition (LOI) of between 55% and 65%. In some instances, at least 95% or at least 97% of all cerium species in the cerium (IV) hydroxide wet cake may be cerium (IV) ($Ce^{4+}$). In some instances, a ratio of $CeO_2$/total rare earth oxides (TREO) may be at least 99% or at least 99.5% in the cerium (IV) hydroxide wet cake. In some instances, a percentage of cerium oxide in the cerium (IV) hydroxide wet cake may be between 35% and 60%.

Cerium (IV) hydroxide wet cake may have one or more impurities. For instance, exemplary cerium (IV) hydroxide wet cake may include, at no more than 0.01 wt % for each impurity, one or more of: aluminum oxide ($Al_2O_3$), $Cl^-$, $Na^+$, iron oxide ($Fe_2O_3$), zinc oxide (ZnO), and silicon oxide ($SiO_2$).

The cerium (IV) hydroxide wet cake may be dissolved in a strong acid solution, such as $HNO_3$. In some implementations, a weight percentage of strong acid in the strong acid solution may be greater than about 65%, such as between about 65% and about 68%. The strong acid solution may be at an elevated temperature, such as between about 65° C. and about 100° C. A molar ratio of strong acid to $CeO_2$ may be between 4.1 and 5.5. In some instances, a weight percentage of the wet cake is about 42%. A resulting slurry may be agitated at 65-100° C. for 5-30 minutes. In some instances, agitation may end when the slurry has a transparent red hue.

Resulting $Ce(NO_3)_4$ solutions may have a concentration of between 250-300 g $CeO_2$ per liter and may have more than 97% of all cerium species be cerium (IV) ($Ce^{4+}$). Resulting $Ce(NO_3)_4$ solutions may have a molar ratio of between 0.1-0.5 for [$H^+$]/all cerium species.

III. Exemplary Methods for Synthesizing Doped Cerium Oxide Particles

Exemplary methods can be used to synthesize doped cerium oxide particles. Other embodiments than those discussed below may include more or fewer operations. Exemplary methods for generating doped cerium oxide particles typically involve adding dopant before hydrolysis but after precipitation. In some instances, dopant may also be added after hydrolysis, in addition to dopant added before hydrolysis.

Exemplary methods may begin by preparing a $Ce(NO_3)_4$ solution having a rare earth oxide concentration of between 10 grams and 50 grams $CeO_2$ per liter solvent. In some implementations, cerium (IV) nitrate ($Ce(NO_3)_4$) solutions generated using methods described above may be diluted to achieve a rare earth oxide concentration of, for instance, between 10 grams and 50 grams $CeO_2$ per liter solvent; between 10 grams and 30 grams $CeO_2$ per liter solvent; between 15 grams and 25 grams $CeO_2$ per liter solvent; or between 20 grams and 40 grams $CeO_2$ per liter solvent. For example, a prepared $Ce(NO_3)_4$ solution may comprise at least 10 grams $CeO_2$ per liter solvent; at least 20 grams $CeO_2$ per liter solvent; at least 30 grams $CeO_2$ per liter solvent; or at least 40 grams $CeO_2$ per liter solvent. Deionized water may be used as a diluent.

Next, one or more dopants may be added to the $Ce(NO_3)_4$ solution. Various dopants may be added at this stage. Exemplary dopants are discussed in greater detail above, and may include silicon dioxide ($SiO_2$) powder, silicon dioxide ($SiO_2$) gel, tetraethyl orthosilicate (TEOS), white carbon black, aluminum oxide ($Al_2O_3$) powder, lanthanum (La), a zeolite. Typically, an amount of dopant added is between 0.1 wt % and 10 wt % of the $Ce(NO_3)_4$ solution. Exemplary silicon dioxide ($SiO_2$) powder may have a BET surface area of 200-250 $m^2$/g. Exemplary aluminum dioxide ($Al_2O_3$) powder may have a BET surface area of 200-250 $m^2$/g.

After adding dopant, the mixture is heated to a predetermined temperature. Typically, the predetermined temperature may be between 120° C. and 150° C. In various implementations, the predetermined temperature may be between 120° C. and 130° C.; between 130° C. and 140° C.; or between 140° C. and 150° C. Heating to the predetermined temperature may take between 30 minutes and 2 hours. After reaching the predetermined temperature, the predetermined temperature of the mixture may be maintained for about 6 hours to about 12 hours. During this time, hydrolysis may occur.

After the hydrolysis operations, the resulting mixture may be cooled. In some instances, the temperature of the resulting mixture is lowered to be less than 50° C.

At this point, optionally, one or more dopants may be added. Exemplary dopants are discussed in greater detail above, and may include silicon dioxide ($SiO_2$) powder, silicon dioxide ($SiO_2$) gel, tetraethyl orthosilicate (TEOS), white carbon black, aluminum oxide ($Al_2O_3$) powder, lanthanum (La), a zeolite, or a combination thereof. Typically, an amount of dopant added is between 0.1 wt % and 10 wt % of the $Ce(NO_3)_4$ solution. When dopant is added at this stage, a resulting mixture may be agitated for a predetermined period of time, usually between 30-90 minutes, such as 30 minutes, 60 minutes, or 90 minutes.

Next, a resulting mixture, usually a slurry, is neutralized to a pH between 8 and 9. Typically, resulting slurries are precipitated upon neutralization. In some instances, a weak base such as ammonium hydroxide ($NH_4OH$) may be used to neutralize the pH. When ammonium hydroxide is used, a concentration may be greater than 25%. Neutralizing the resulting mixture may be accompanied by agitation for a predetermined amount of time, such as between 10 minutes and 30 minutes.

After neutralizing, optionally, one or more dopants may be added. Exemplary dopants are discussed in greater detail above, and may include silicon dioxide ($SiO_2$) powder, silicon dioxide ($SiO_2$) gel, tetraethyl orthosilicate (TEOS), white carbon black, aluminum oxide ($Al_2O_3$) powder, lanthanum (La), a zeolite. Typically, an amount of dopant added is between 0.1 wt % and 10 wt % of the $Ce(NO_3)_4$ solution. When dopant is added at this stage, a resulting mixture may be agitated for a predetermined period of time, usually between 30-90 minutes, such as 30 minutes, 60 minutes, or 90 minutes.

Then resulting precipitate is subjected to filtration. Exemplary filtration operations generate a filtrate, typically a wet cake, and a permeate. Any type of filtration known in the art may be used to generate a wet cake as the filtrate.

The wet cake filtrate may be dried and calcined at a given temperature for a predetermined amount of time. A resulting product is typically doped cerium oxide powder. As an example, the wet cake filtrate may be calcined at 300° C. for 10 hours. As an example, the wet cake filtrate may be calcined at 500° C. for 8 hours. As an example, the wet cake filtrate may be calcined at 700° C. for 5 hours. In certain implementations, after calcining the wet cake filtrate at 300° C. for 10 hours, the $CeO_2$ powder is calcined at 900° C. for 5 hours.

In some instances, one or more dopants may be impregnated into the calcined filtrate (typically a powder). For example, silicon dioxide ($SiO_2$) gel or tetraethyl orthosilicate (TEOS) may be doped into the calcined filtrate. In these implementations, doping may be followed by drying and then calcination at a predetermined temperature for a predetermined period of time. For example, impregnated powder may be calcined at 500° C. for 5 hours.

IV. Example Applications

Exemplary embodiments of doped cerium oxide can be used in a variety of applications. In some instances, doped cerium oxide has improved properties in oxygen mobility that can particularly lend the use of the particles as catalysts. For instance, exemplary doped cerium oxide particles may be used for purifying exhaust gas, in carbon monoxide (CO) oxidation, hydrogenation of carbon dioxide ($CO_2$), the production of hydrogen gas ($H_2$) through the water-gas shift reaction, and the reforming of methane ($CH_4$) or alcohols.

In some instances, an example method of generating hydrogen gas ($H_2$) comprises contacting exemplary doped cerium oxide as described herein with a precursor feedstock. In some instances, an example method of converting carbon dioxide ($CO_2$) to methane ($CH_4$) comprises contacting exemplary doped cerium oxide as described herein with carbon dioxide ($CO_2$). In some instances, an example method of removing nitrous oxide ($N_2O$) from a feedstock comprises contacting exemplary doped cerium oxide as described herein with a feedstock including nitric acid ($HNO_3$) and/or adipic acid ($CH_2)_4(COOH)_2$.

V. Experimental Examples

Without limiting the scope of the instant disclosure, various experimental examples of embodiments discussed above were prepared and results are discussed below.

A. Preparation of $Ce(OH)_4$ Raw Material and $Ce(NO_3)_4$ Solution

An experimental example of $Ce(OH)_4$ raw material was prepared according to the following operations. First, 0.5 L of NaOH solution with 2.5 mol/L concentration was added into a 2 L beaker. The resulting mixture was agitated at 25-30° C. with 800-1,000 rpm agitation speed.

Next, air was bubbled into the above NaOH solution through a porous air distributor with 200-250 L-air/hour flow rate. Then 0.5 L of $CeCl_3$ solution with 100 g-$CeO_2$/L concentration was slowly dropped into the above air bubbled NaOH solution at 25-30° C. for 2 hours. The above 100 g-$CeO_2$/L $CeCl_3$ solution was prepared by the dilution of concentration of about 300 g-$CeO_2$/L initial $CeCl_3$ solution (free [$H^+$]=0.1 mol/L) with de-ionized water.

After 2 hours of reverse precipitation, the slurry was continuously aged for 2 hours at 25-30° C., the color of slurry changed from purple to yellow, and the final pH=12.5-13.5. The precipitate was subjected to a first filtration, and first washed with de-ionized water to remove $Na^+$ and $Cl^-$ impurities.

The first washed precipitate was repulped into 1 L of NaOH solution with 0.025 mol/L, and strongly agitated at 25-30° C. with 800-1,000 rpm agitation speed, at the same time air was bubbled into the above repulped slurry with 200-250 L-air/h flow rate. After 1 hour of aging at 25-30° C., the color of the slurry changed to more bright yellow.

The precipitate was subjected to a second filtration, and washed 5 times with 1 L de-ionized water (60-65° C.), and 1 time of 1 L de-ionized water diluted $HNO_3$ solution (pH=4.5-5, 60-65° C.), the final filtrate had a pH=8-9 and an electrical conductivity (EC) less than 20 μS/cm. After the second washing and filtration, $Ce(OH)_4$ wet cake was obtained. The resulting $Ce(OH)_4$ composition had the following properties: $Ce^{4+}/\Sigma Ce$=98.5%; $CeO_2$/TREO=99.8%; TREO=42.0% (where TREO is total rare earth oxides).

An exemplary $Ce(NO_3)_4$ solution was prepared as follows. The prepared $Ce(OH)_4$ wet cake (TREO=42.0%) was added into $HNO_3$ solution with 65-68% concentration, $HNO_3/CeO_2$ mole ratio=4.5. The slurry was agitated and dissolved at 65-100° C. for several minutes, until a transparent red solution with about 300 g-$CeO_2$/L concentration was formed.

B. Preparation of Experimental Powders

1. Example 1

An amount of $Ce(NO_3)_4$ initial solution (about 300 g-$CeO_2$/L) was diluted with de-ionized water to prepare 0.5 L of $Ce(NO_3)_4$ solution with 20 g-$CeO_2$/L concentration. 5 wt % of $SiO_2$ powder (BET surface area=200-250 m$^2$/g) was added into the above diluted $Ce(NO_3)_4$ solution.

The mixed solution was added into 1 L of autoclave, and then agitated and heated up from room temperature to 125° C. in 0.5 hours. The hydrolysis reaction was carried out at 125° C. for 6 hours. After 6 hours of the hydrolysis reaction, the slurry was cooled down to less than 50° C.

The slurry was neutralized and precipitated with $NH_4OH$ solution (>25%) until achieving a pH=8.5, and then agitated for 10 min. Then the precipitate was filtrated.

The wet cake was dried and then calcined at 300° C./10 hours, 500° C./8 hours, and 700° C./5 hours, respectively. $CeO_2$ powder calcined at 300° C./10 h was calcined again at 900° C./5 h.

2. Example 2

The preparation method of Example 1 was followed, except that the amount of added $SiO_2$ powder was changed to 10 wt %.

3. Example 3

The preparation method of Example 1 was followed, except that 10 wt % of $SiO_2$ powder was added into the cooled slurry after the 6 hour hydrolysis reaction.

4. Example 4

The preparation method of Example 1 was followed, except that 10 wt % of $SiO_2$ powder was added into the precipitated slurry after the step of neutralization with $NH_4OH$ solution, and then agitated for 30 min.

5. Example 5

The preparation method of Example 3 was followed, except that the dopant was changed to 10 wt % of conventional $Al_2O_3$ powder (BET surface area=200-250 m²/g).

C. Physical Characteristics of Experimental Powders

Various physical characteristics of the exemplary powders were measured and the results are shown in Table 1 below. Test procedures for BET surface area, X-ray diffraction (XRD), and Hydrogen temperature-programmed reduction ($H_2$-TPR) are described in greater detail above.

TABLE 1

BET surface area, total pore volume, pore volume (d > 3 nm)/Total Pore volume, oxygen storage capacity (OSC), H2-TPR profile, and crystal size data for experimentally produced powders.

| Item | unit | Example 1 | Example 2 | Example 3 | Example 4 | Example 5 |
|---|---|---|---|---|---|---|
| BET (300° C./10 h) | m²/g | 248.6 | 262.6 | 258.9 | 249.6 | 245.2 |
| BET (500° C./8 h) | m²/g | 176.3 | 190.7 | 185.3 | 181.7 | 172.6 |
| BET (700° C./5 h) | m²/g | 121.6 | 135.3 | 131.7 | 128.4 | 124.8 |
| BET (900° C./5 h) | m²/g | 65.6 | 88.5 | 75.8 | 72.3 | 65.5 |
| Total Pore Volume (300° C./10 h) | mL/g | 0.62 | 0.68 | 0.63 | 0.61 | 0.60 |
| Total Pore Volume (500° C./8 h) | mL/g | 0.58 | 0.63 | 0.61 | 0.60 | 0.57 |
| Total Pore Volume (700° C./5 h) | mL/g | 0.50 | 0.56 | 0.53 | 0.52 | 0.49 |
| Total Pore Volume (900° C./5 h) | mL/g | 0.46 | 0.53 | 0.49 | 0.47 | 0.45 |
| Pore Volume (d > 3 nm)/Total Pore Volume (300° C./10 h) | % | 99.6 | 99.5 | 99.6 | 99.5 | 99.6 |
| Pore Volume (d > 3 nm)/Total Pore Volume (500° C./8 h) | % | 99.3 | 99.1 | 99.4 | 99.2 | 99.3 |
| Pore Volume (d > 3 nm)/Total Pore Volume (700° C./5 h) | % | 98.9 | 98.6 | 99.0 | 99.0 | 99.1 |
| Pore Volume (d > 3 nm)/Total Pore Volume (900° C./5 h) | % | 98.2 | 98.1 | 98.3 | 98.2 | 98.3 |
| OSC (500° C./8 h) | μmol-O2/g | 940 | 1220 | 1180 | 1150 | 1115 |
| OSC (700° C./5 h) | μmol-O2/g | 865 | 1130 | 1100 | 1045 | 1005 |
| OSC (900° C./5 h) | μmol-O2/g | 720 | 1045 | 995 | 985 | 955 |
| S(200-600° C.)/S(600-800° C.) in H2-TPR profile after 500° C./8 h calcination | | 1.73 | 1.28 | 1.18 | 1.12 | 1.07 |
| S(200-600° C.)/S(600-800° C.) in H2-TPR profile after 700° C./5 h calcination | | 1.23 | 0.81 | 0.79 | 0.75 | 0.74 |
| S(200-600° C.)/S(600-800° C.) in H2-TPR profile after 900° C./5 h calcination | | 0.62 | 0.42 | 0.41 | 0.40 | 0.39 |
| Crystal Size (500° C./8 h) | nm | 6.4 | 6.8 | 6.5 | 6.5 | 6.6 |

EXEMPLARY EMBODIMENTS

For reasons of completeness, various aspects of the technology are set out in the following numbered embodiments:

Embodiment 1

A doped cerium oxide particle, comprising
about 90 weight percent (wt. %) to about 99.9 wt. % cerium oxide ($CeO_2$); and up to about 10 wt. % dopant,
wherein the doped cerium oxide particle has a BET specific surface area of more than 150 m²/g after calcination at 500° C. for 8 hours; and
wherein the doped cerium oxide particle has an oxygen storage capacity (OSC) of more than 900 μmol·$O_2$/g after calcination at 500° C. for 8 hours.

Embodiment 2

The doped cerium oxide particle according to embodiment 1, wherein the dopant is present at 0.1 wt % to 5 wt %; and
wherein the dopant comprises silicon dioxide ($SiO_2$) powder, silicon dioxide ($SiO_2$) gel, tetraethyl orthosilicate (TEOS), white carbon black, aluminum oxide ($Al_2O_3$) powder, $La_2O_3$, $Nd_2O_3$, a zeolite, or a combination thereof.

Embodiment 3

The doped cerium oxide particle according to embodiment 1 or embodiment 2, wherein the doped cerium oxide particle has a total pore volume of between 0.40 mL/g and 0.8 mL/g after calcination at 500° C. for 8 hours.

Embodiment 4

The doped cerium oxide particle according to any one of embodiments 1-3, wherein the doped cerium oxide particle has a pore volume (d>3 nm)/total pore volume of at least 98% after calcination at 500° C. for 8 hours.

Embodiment 5

The doped cerium oxide particle according to any one of embodiments 1-4, wherein the doped cerium oxide particle has an oxygen storage capacity (OSC) of about 800 $\mu mol \cdot O_2/g$ to about 1100 $\mu mol \cdot O_2/g$ after calcination at 700° C. for 5 hours.

Embodiment 6

The doped cerium oxide particle according to any one of embodiments 1-5, wherein the doped cerium oxide particle has a crystal size of less than 10 nm after calcination at 500° C. for 8 hours.

Embodiment 7

The doped cerium oxide particle according to any one of embodiments 1-6, wherein the doped cerium oxide particle has a BET specific surface area of about 55 $m^2/g$ to about 100 $m^2/g$ after calcination at 900° C. for 5 hours.

Embodiment 8

A method of generating hydrogen gas ($H_2$), comprising contacting the doped cerium oxide of any one of embodiments 1-7 with a precursor feedstock.

Embodiment 9

A method of converting carbon dioxide ($CO_2$) to methane ($CH_4$), the method comprising contacting the doped cerium oxide of any one of embodiments 1-7 with carbon dioxide ($CO_2$).

Embodiment 10

A method of removing nitrous oxide ($N_2O$) from a feedstock, the method comprising contacting the doped cerium oxide of any one of embodiments 1-7 with a feedstock including nitric acid ($HNO_3$) and/or adipic acid $(CH_2)_4(COOH)_2$.

Embodiment 11

A method for generating a doped cerium oxide particle, the method comprising:
  adding at least one dopant to a $Ce(NO_3)_4$ solution, the $Ce(NO_3)_4$ solution having a rare earth oxide concentration of between 10 grams and 50 grams $CeO_2$ per liter solvent;
  after adding the at least one dopant, heating the $Ce(NO_3)_4$ solution with dopant to cause hydrolysis;
  cooling a resulting mixture;
  neutralizing the resulting mixture to a pH between 8 and 9;
  filtrating the neutralized mixture to generate a filtrate and a permeate;
  calcinating the filtrate; and
  drying.

Embodiment 12

The method according to embodiment 11, wherein calcinating the filtrate is performed for at least 10 hours in an environment that is 300° C.

Embodiment 13

The method according to embodiment 11 or embodiment 12, wherein calcinating the filtrate is performed for at least 5 hours in an environment that is 500° C.

Embodiment 14

The method according to any one of embodiments 11-13, further comprising diluting a $Ce(NO_3)_4$ solution having an equivalent of between 250 grams and 300 grams $CeO_2$ per liter solvent.

Embodiment 15

The method according to embodiment 14, wherein deionized water is used for diluting.

Embodiment 16

The method according to any one of embodiments 11-15, wherein the $Ce(NO_3)_4$ solution is heated to about 120° C. to about 150° C.

Embodiment 17

The method according to embodiment 16, wherein the $Ce(NO_3)_4$ solution is heated for about 6 hours to about 12 hours.

Embodiment 18

The method according to any one of embodiments 11-17, wherein cooling lowers a temperature of the resulting mixture to be less than 50° C.

Embodiment 19

The method according to any one of embodiments 11-18, further comprising after cooling and before neutralizing, adding a second dopant.

Embodiment 20

The method according to any one of embodiments 11-19, further comprising after neutralizing and before filtrating, adding a third dopant and agitating.

Embodiment 21

The method according to any one of embodiments 11-20, further comprising impregnating TEOS or $SiO_2$ gel into the calcined filtrate.

Embodiment 22

The method according to embodiment 21, further comprising calcinating the impregnated filtrate at 500° C. for at least 5 hours.

Embodiment 23

The method according to any one of embodiments 11-22, wherein ammonium hydroxide ($NH_4OH$) is used during neutralization.

Embodiment 24

The method according to embodiment 23, wherein neutralization includes agitation; and
wherein a concentration of the NH$_4$OH solution is at least 25%.

Embodiment 25

The method according to any one of embodiments 11-24, wherein the dopant comprises silicon dioxide (SiO$_2$) powder, silicon dioxide (SiO$_2$) gel, tetraethyl orthosilicate (TEOS), white carbon black, aluminum oxide (Al$_2$O$_3$) powder, lanthanum (La), a zeolite, or combinations thereof.

The foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A doped cerium oxide particle, comprising
about 90 weight percent (wt. %) to about 99.9 wt. % cerium oxide (CeO$_2$); and
up to about 10 wt. % dopant,
wherein the doped cerium oxide particle has a BET specific surface area of more than 150 m$^2$/g after calcination at 500° C. for 8 hours; and
wherein the doped cerium oxide particle has an oxygen storage capacity (OSC) of more than 900 μmol·O$_2$/g after calcination at 500° C. for 8 hours.

2. The doped cerium oxide particle according to claim 1, wherein the dopant is present at 0.1 wt % to 5 wt %; and wherein the dopant comprises silicon dioxide (SiO$_2$) powder, silicon dioxide (SiO$_2$) gel, tetraethyl orthosilicate (TEOS), white carbon black, aluminum oxide (Al$_2$O$_3$) powder, La$_2$O$_3$, Nd$_2$O$_3$, a zeolite, or a combination thereof.

3. The doped cerium oxide particle according to claim 1, wherein the doped cerium oxide particle has a total pore volume of between 0.40 mL/g and 0.8 mL/g after calcination at 500° C. for 8 hours.

4. The doped cerium oxide particle according to claim 1, wherein the doped cerium oxide particle has a pore volume (d>3 nm)/total pore volume of at least 98% after calcination at 500° C. for 8 hours.

5. The doped cerium oxide particle according to claim 1, wherein the doped cerium oxide particle has an oxygen storage capacity (OSC) of about 800 μmol·O$_2$/g to about 1100 μmol· O$_2$/g after calcination at 700° C. for 5 hours.

6. The doped cerium oxide particle according to claim 1, wherein the doped cerium oxide particle has a crystal size of less than 10 nm after calcination at 500° C. for 8 hours.

7. The doped cerium oxide particle according to claim 1, wherein the doped cerium oxide particle has a BET specific surface area of about 55 m$^2$/g to about 100 m$^2$/g after calcination at 900° C. for 5 hours.

8. A method of converting carbon dioxide (CO$_2$) to methane (CH$_4$), the method comprising contacting the doped cerium oxide of claim 1 with carbon dioxide (CO$_2$).

9. A method of removing nitrous oxide (N$_2$O) from a feedstock, the method comprising contacting the doped cerium oxide of claim 1 with a feedstock including nitric acid (HNO$_3$) and/or adipic acid (CH$_2$)$_4$(COOH)$_2$.

10. The doped cerium oxide particle according to claim 1, wherein the doped cerium oxide particle has a BET specific surface area of between 175 m$^2$/g and 200 m$^2$/g after calcination at 500° C. for 8 hours.

* * * * *